March 31, 1959     C. A. GRULKE ET AL     2,880,123
PRIMARY BATTERY WITH CONTROLLABLE CATHODE POTENTIAL
Filed April 30, 1954
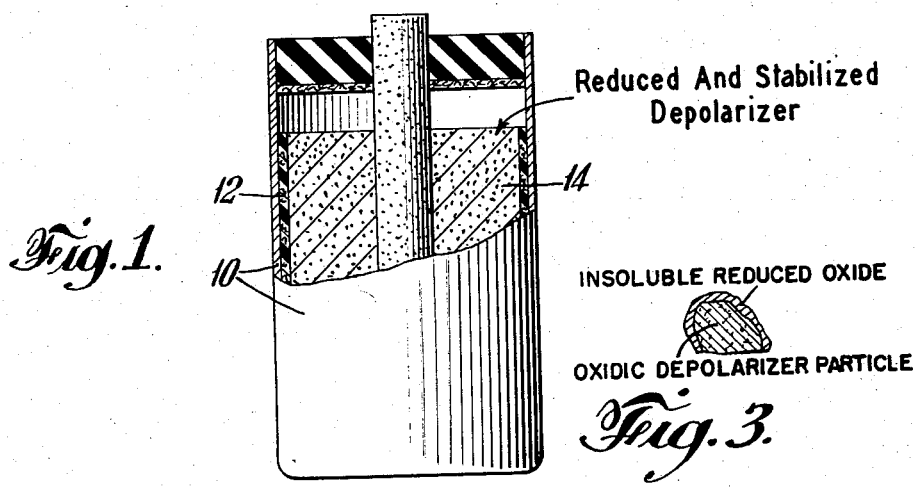
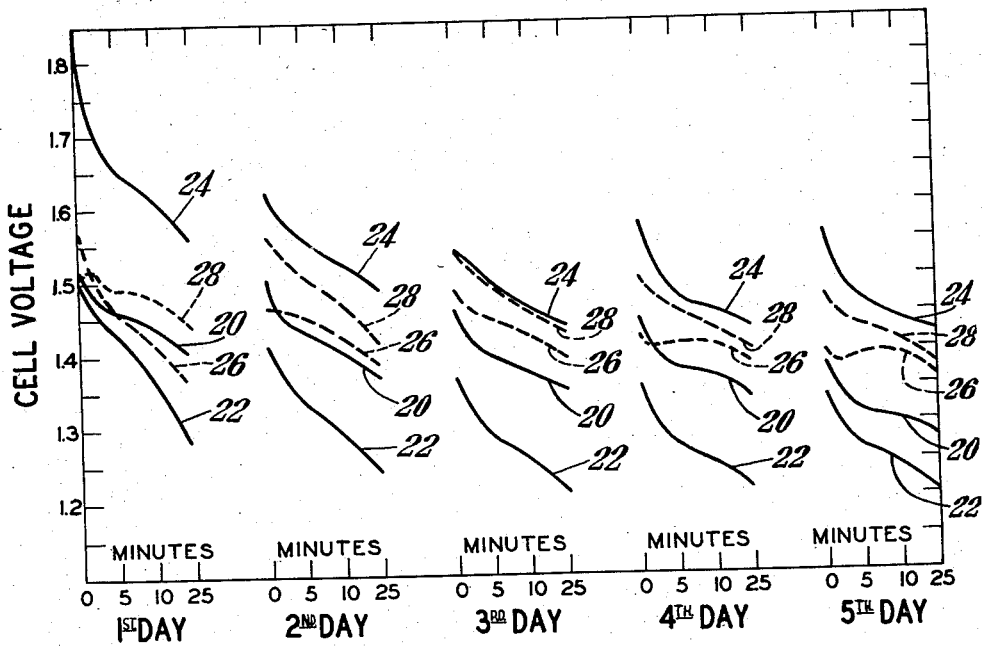
INVENTORS
CARL A. GRULKE
RUSSELL P. FOX
BY John F. Hohmann
ATTORNEY

United States Patent Office 2,880,123
Patented Mar. 31, 1959

2,880,123

PRIMARY BATTERY WITH CONTROLLABLE CATHODE POTENTIAL

Carl A. Grulke, Berea, and Russell P. Fox, Fairview Park, Ohio, assignors to Union Carbide Corporation, a corporation of New York Application April 30, 1954, Serial No. 426,855

1 Claim. (Cl. 136—138)

This invention relates to a method for controlling the voltage range of primary galvanic cells utilizing manganese dioxide depolarizers.

Primary galvanic cells utilizing manganese dioxide depolarizers and having metals other than zinc for their anodes are of rapidly growing interest because of the scarcity of zinc metal and of the different voltage characteristics, such as flatness of the later portion of the discharge curve, obtainable by their use. Before a cell such as the magnesium cell can be used interchangeably with the commercial zinc cell, it is necessary to reduce its initial voltage to that of the zinc cell, as failure to do so results in deterioration and unnecessary loss of efficiency on the part of battery-operated electronic equipment.

Previous work evidences the inability of the art to devise practical voltage control methods capable of rendering interchangeable cells having different electrodes. Thus, previous attempts to replace zinc electrodes by magnesium electrodes by either using dropping resistors or by modifying the centering voltage of the equipment have been basically impractical because the high peak voltage obtained and its consequent power loss has resulted invariably in reducing the effective service output.

The present invention has for its principal object a primary cell having a controlled cathode potential permitting the obtaining of desired initial voltages. Another object is to provide a novel depolarizing mix for primary cells employing magnesium anodes.

A still further object is to reduce open circuit anode corrosion and thereby improve the shelf life of the cell without using conventional local action inhibiting means.

Its further object is to provide a magnesium cell having essentially the same initial voltage as a commercial zinc cell, but which retains its characteristic higher voltage level during the final portion of service. Within the term "magnesium" are included alloys of magnesium with metals placed near it on the electro-motive series. An example of a suitable alloy is one containing 2% of aluminum and 2% of manganese.

In the drawings, Fig. 1 is a sectional, elevational view of a cell embodying this invention. Fig. 2 is a graph showing typical voltage curves for such a cell. Fig. 3 is an enlarged cross-sectional view of an individual depolarizing particle coated according to the present invention.

As the initial voltage of a cell is controlled by the surface potential of the depolarizing particles, the objects of this invention are attained by forming on the surface of the depolarizer a thin coating of low voltage manganese oxide and further adjusting the desired initial voltage through pH control. In the practice of the invention the surface treatment is achieved by mixing with the depolarizing ore a water-soluble salt of a polyvalent metal, whose cation forms an insoluble compound with the cell cathode at the given pH, and subsequently reduces the surface of the depolarizer to a lower oxide form having the desired voltage.

The normal magnesium cell using a magnesium bromide electrolyte operates at an initial voltage approximately 0.3 to 0.5 volt higher than the commercial zinc cell when depolarizing mixture in the latter had a pH near 5.1. As an example of the practice of this invention, the initial voltage of such a cell was reduced by 0.3 to 0.5 volt, and thereby made interchangeable with said zinc cell by the following procedure. The manganese dioxide depolarizing ore was intimately mixed with 1% of manganous sulfate in the form of a one molar solution and with 2% of magnesium oxide (as a solid powder), thus raising its pH to 8.1. No chromate inhibitor for the magnesium anode, either in the form of soluble alkali or alkaline earths, was added. This mixture was incorporated in a cell of identical construction with the one shown in Fig. 1 in which a cupped magnesium electrode 10 serves as the anodic material; 12 is a bibulous lining; 14 is a carbon electrode forming with the depolarizing mix the cell cathode; and wherein is present a magnesium bromide electrolyte.

This cell was tested initially (within seven days of assembly), and after a delay of 6 to 8 weeks by discharging continuously on a 4 ohm load for 25 minutes daily for five consecutive days. It is apparent from graph curves 20 of Fig. 2 that its initial voltage approximated that of a commercial zinc cell shown by curves 22, while during its final portion of service it substantially retained the higher voltage characteristics of the standard magnesium cell represented by curve 24. Similar results obtained after a 6 to 8 weeks' delay as shown by curves 26. Cells of like composition with a major venting hole also give similar results as indicated by curves 28.

In every case it was found that the voltage depression was proportional to the amount of manganous sulfate added, showing that the degree or depth of surface reduction can be utilized to control the initial voltage. For this specific application, where the cell anode was composed of magnesium, amounts of this compound ranging from 1% to 5% gave the best results. Other types of cell construction or end use might require a different range of quantities.

The method of this invention is susceptible to many variations and applications. pH control may be effected in any other known manner as, for example, by the use of ammonium hydroxide, magnesium hydroxide, or manganous oxide; similarly the reducing form of a salt having a polyvalent cation may be used in equivalent quantities in place of manganous sulfate, the only limitation being that its cations must form insoluble layers with the cathodic materials at the working pH, and that the new salt thus formed is compatible with cell components. Among suitable cations in addition to manganese are tin, iron and lead. Suitable anions are the bromide, sulfate, chloride, bicarbonate, acetate, and borate radicals. These ions may be supplied in the form of a one molar solution or in an equivalent amount at another convention concentration.

As stated above, the preferred metallic salt for use as a reducing agent in a cell having a magnesium anode is manganous sulfate. Where the anode is composed of aluminum, $Mn_3(PO_4)_2$ and $Mn(C_2H_3O_2)_2$ would give the most satisfactory results. For cells having zinc anodes, $MnCl_2$ is the preferred metallic salt for use with the depolarizing mix.

While this invention has been specifically described with respect to making a cell having a magnesium anode substantially equal in voltage to a cell using a zinc anode, its method generally is equally amenable to rendering interchangeable cells having other anodes.

Related subject matter is disclosed and claimed in our co-pending applications, Serial Numbers 426,853 and 426,854.

What is claimed is:

A depolarizing mixture for use in a primary galvanic cell comprising manganese dioxide particles and about 1 to 5 percent by weight thereof of an agent selected from the group consisting of manganous sulfate, manganese phosphate, manganese chloride, manganese acetate, said manganese dioxide particles having thereon a thin insoluble coating of a reduced form thereof.

References Cited in the file of this patent

UNITED STATES PATENTS

| | | |
|---|---|---|
| 1,160,907 | Koretzsky | Nov. 16, 1915 |
| 1,221,062 | Kaplan | Apr. 3, 1917 |
| 1,232,904 | Ellis | July 10, 1917 |
| 1,538,895 | Hirsch | May 26, 1925 |
| 2,547,907 | Fry et al. | Apr. 3, 1951 |
| 2,678,343 | Daniel | May 11, 1954 |

FOREIGN PATENTS

| | | |
|---|---|---|
| 21,348 | Great Britain | Sept. 26, 1906 |

OTHER REFERENCES

Transactions Electrochemical Society, vol. 53 pp. 83 to 92.

Transactions Electrochemical Society, vol. 68 pp. 177 to 185.

Meller, J. W.: "A Comprehensive Treatise on Inorganic and Theoretical Chemistry," Longmans, Green and Company, London, 1947, vol. XII, pages 225, 226, 279 and 289.

Lange, N. A.: "Handbook of Chemistry," Handbook Publishers, Inc., Sandusky, Ohio, 1949, page 1109.